US012604164B2

(12) United States Patent
Aghatehrani et al.

(10) Patent No.: US 12,604,164 B2
(45) Date of Patent: Apr. 14, 2026

(54) SYSTEM AND METHODS FOR HYDROGEN PLANT CONDITION MONITORING USING A WIRELESS MODULAR SENSOR SYSTEM

(71) Applicant: Ohmium International, Inc., Newark, CA (US)

(72) Inventors: Rasool Aghatehrani, Redwood City, CA (US); Arne Ballantine, Incline Village, NV (US)

(73) Assignee: Ohmium International, Inc., Newark, CA (US)

( * ) Notice: Subject to any disclaimer, the term of this patent is extended or adjusted under 35 U.S.C. 154(b) by 0 days.

(21) Appl. No.: 18/438,221

(22) Filed: Feb. 9, 2024

(65) Prior Publication Data

US 2024/0276185 A1     Aug. 15, 2024

Related U.S. Application Data

(60) Provisional application No. 63/444,404, filed on Feb. 9, 2023.

(51) Int. Cl.
*H04W 4/38* (2018.01)
*G01D 21/02* (2006.01)

(52) U.S. Cl.
CPC .............. *H04W 4/38* (2018.02); *G01D 21/02* (2013.01)

(58) Field of Classification Search
CPC ................................ H04W 4/38; G01D 21/02
See application file for complete search history.

(56) References Cited

U.S. PATENT DOCUMENTS

| | | | | | |
|---|---|---|---|---|---|
| 11,195,189 | B1 * | 12/2021 | Advani | .................. | G06F 16/215 |
| 2008/0192232 | A1 * | 8/2008 | Ninomiya | ................. | F23N 5/24 |
| | | | | | 356/51 |
| 2011/0018996 | A1 | 1/2011 | Mian et al. | | |
| 2012/0200149 | A1 * | 8/2012 | Rudakevych | ........ | B62D 55/075 |
| | | | | | 301/62 |
| 2019/0369075 | A1 | 12/2019 | Schwartz et al. | | |
| 2020/0030235 | A1 | 1/2020 | Lin | | |
| 2020/0146103 | A1 * | 5/2020 | Wang | ...................... | H04W 4/38 |
| 2021/0005966 | A1 * | 1/2021 | Tran | ..................... | H04B 17/318 |
| 2021/0357664 | A1 | 11/2021 | Kocer et al. | | |
| 2022/0136656 | A1 | 5/2022 | Clarke et al. | | |
| 2022/0312698 | A1 | 10/2022 | Burkey et al. | | |
| 2024/0144309 | A1 * | 5/2024 | Borgerson | ............. | G06Q 50/06 |

FOREIGN PATENT DOCUMENTS

WO     WO 2024/168296     8/2024

OTHER PUBLICATIONS

PCT Application No. PCT/US24/15247, International Search Report and Written Opinion mailed May 22, 2024.
PCT Application No. PCT/US2024/015247, International Preliminary Report on Patentability dated Aug. 21, 2025.

* cited by examiner

*Primary Examiner* — James J Yang

(74) *Attorney, Agent, or Firm* — Polsinelli LLP

(57)     ABSTRACT

A system for monitoring a hydrogen plant includes a plurality of wireless sensor modules, each wireless sensor module including at least one sensor configured for monitoring for at least one condition and a wireless interface configured for transmitting data concerning the at least one condition via a wireless network to a remote station when the at least one condition is detected by the at least one sensor, wherein the plurality of wireless sensor modules cooperatively extend the wireless network to an area of the hydrogen plant wider than a range of an individual wireless interface.

13 Claims, 7 Drawing Sheets

Alert

Condition: Wireless sensor module has been moved 15 feet from original location. 404

Current Location: 42.1055794, -87.7468071 (Tank 2) 406

Date/time of movement: 3-14-23/ 23:11:05 408

228

214 Energy Storage

216 Charging Port

202

102 Sensor(s)

208 CPU

203 Wireless Interface

402 Movement Detection Sensor

210 Memory    212 Module(s)

224

222

214 — Energy Storage
216 — Charging Port
102 — Sensor(s)
208 — CPU
203 — Wireless Interface
502 — Camera
210 — Memory
606 — Navigation System
602 — Drive System
604 — 604
202

Figure 7:
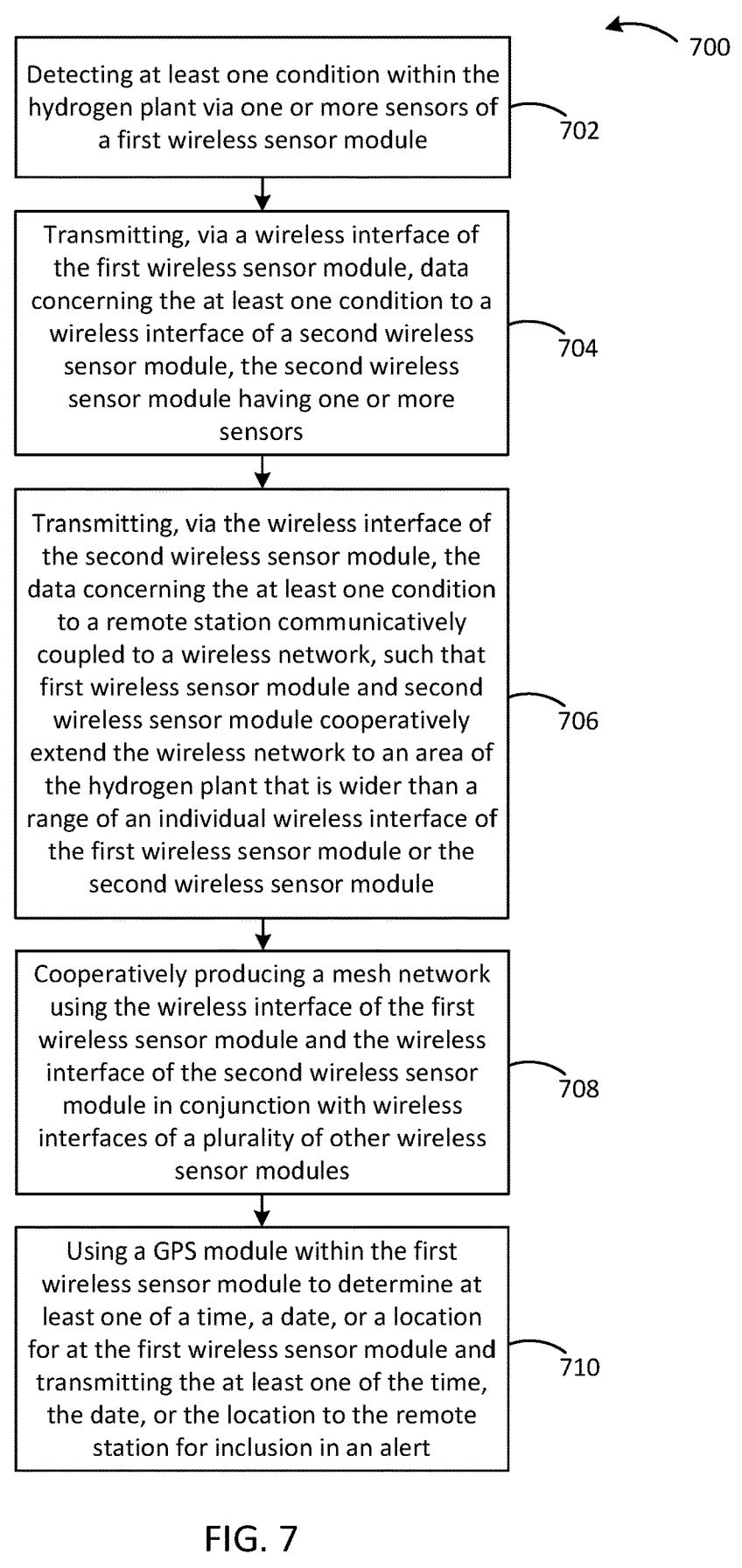

700

Detecting at least one condition within the hydrogen plant via one or more sensors of a first wireless sensor module

702

Transmitting, via a wireless interface of the first wireless sensor module, data concerning the at least one condition to a wireless interface of a second wireless sensor module, the second wireless sensor module having one or more sensors

704

Transmitting, via the wireless interface of the second wireless sensor module, the data concerning the at least one condition to a remote station communicatively coupled to a wireless network, such that first wireless sensor module and second wireless sensor module cooperatively extend the wireless network to an area of the hydrogen plant that is wider than a range of an individual wireless interface of the first wireless sensor module or the second wireless sensor module

706

Cooperatively producing a mesh network using the wireless interface of the first wireless sensor module and the wireless interface of the second wireless sensor module in conjunction with wireless interfaces of a plurality of other wireless sensor modules

708

Using a GPS module within the first wireless sensor module to determine at least one of a time, a date, or a location for at the first wireless sensor module and transmitting the at least one of the time, the date, or the location to the remote station for inclusion in an alert

SYSTEM AND METHODS FOR HYDROGEN PLANT CONDITION MONITORING USING A WIRELESS MODULAR SENSOR SYSTEM

CROSS-REFERENCE TO RELATED APPLICATIONS

This application claims the benefit of U.S. Provisional Application No. 63/444,404, filed Feb. 9, 2023, for "SYSTEM AND METHODS FOR HYDROGEN PLANT CONDITION MONITORING USING A WIRELESS MODULAR SENSOR SYSTEM," which is incorporated herein by reference.

TECHNICAL FIELD

The present disclosure relates to hydrogen production and, more specifically, to systems and methods for monitoring a hydrogen plant for various conditions affecting safety and efficiency.

BACKGROUND

A hydrogen plant includes equipment and hydrogen piping connections with probable hydrogen leakages. Hydrogen is colorless and odorless, and hydrogen flames are invisible to the naked eye. Therefore, detecting hydrogen leaks, as well as conditions that might lead to hydrogen leaks or other safety concerns, is an ongoing challenge in the art of hydrogen production.

Apart from safety, another goal of hydrogen production is efficiency. Many components of a hydrogen production system have a limited lifespan. Failure to detect that a component is nearing the end of its useful life can result in costly shutdowns. Likewise, failure to detect conditions that, while not an immediate safety concern, may decrease the efficiency of hydrogen production is conventionally a challenge with no easy solution.

Unfortunately, current systems for monitoring hydrogen production are deficient in that they are expensive and inflexible. For example, once a sensor has been installed on at a particular location, it can be difficult to relocate the sensor without physically extending the hydrogen plant's communication network. Accordingly, what is needed is a system and method for monitoring a hydrogen plant for safety and efficiency that is both inexpensive and easily expandable.

SUMMARY

The present disclosure includes systems and methods for monitoring a hydrogen plant that overcomes the aforementioned problems. Specifically, the present disclosure includes a technique that uses modular wireless sensors that are inexpensive to install and maintain and allow for flexible placement without having to physically extend the hydrogen plant's communication network. The disclosed technique not only detects hydrogen leaks and other unsafe conditions, but also conditions that may eventually result in hydrogen leaks or decrease the efficiency of the hydrogen plant, allowing for predictive and corrective maintenance.

According to one aspect, a system for monitoring a hydrogen plant includes a plurality of wireless sensor modules, each wireless sensor module including at least one sensor configured for monitoring for at least one condition and a wireless interface configured for transmitting data concerning the at least one condition via a wireless network to a remote station when the at least one condition is detected by the at least one sensor, where the plurality of wireless sensor modules cooperatively extend the wireless network to an area of the hydrogen plant wider than a range of an individual wireless interface.

According to another aspect, a method for monitoring a hydrogen plant includes detecting at least one condition within the hydrogen plant via one or more sensors of a first wireless sensor module. The method also includes transmitting, via a wireless interface of the first wireless sensor module, data concerning the at least one condition to a wireless interface of a second wireless sensor module, the second wireless sensor module having one or more sensors. The method further includes transmitting, via the wireless interface of the second wireless sensor module, the data concerning the at least one condition to a remote station communicatively coupled to a wireless network, such that the first wireless sensor module and the second wireless sensor module cooperatively extend the wireless network to an area of the hydrogen plant that is wider than a range of an individual wireless interface of the first wireless sensor module or the second wireless sensor module.

According to yet another aspect, a non-transitory computer-readable medium comprising program code that, when executed by one or more processors, cause the one or more processors to perform operations including: detecting at least one condition within the hydrogen plant via one or more sensors of a first wireless sensor module; transmitting, via a wireless interface of the first wireless sensor module, data concerning the at least one condition to a wireless interface of a second wireless sensor module, the second wireless sensor module having one or more sensors; and transmitting, via the wireless interface of the second wireless sensor module, the data concerning the at least one condition to a remote station communicatively coupled to a wireless network, such that the first wireless sensor module and the second wireless sensor module cooperatively extend the wireless network to an area of the hydrogen plant that is wider than a range of an individual wireless interface of the first wireless sensor module or the second wireless sensor module.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment. Non-limiting and non-exhaustive descriptions are described with reference to the following drawings. The components in the figures are not necessarily to scale, emphasis instead being placed upon illustrating principles of the disclosed embodiments.

FIG. 7 is a flowchart of a method for monitoring a hydrogen plant according to an embodiment of the present disclosure.

DETAILED DESCRIPTION

Figure 1:
FIG. 1 is a block diagram a conventional system for hydrogen plant condition monitoring.
Figure 1:
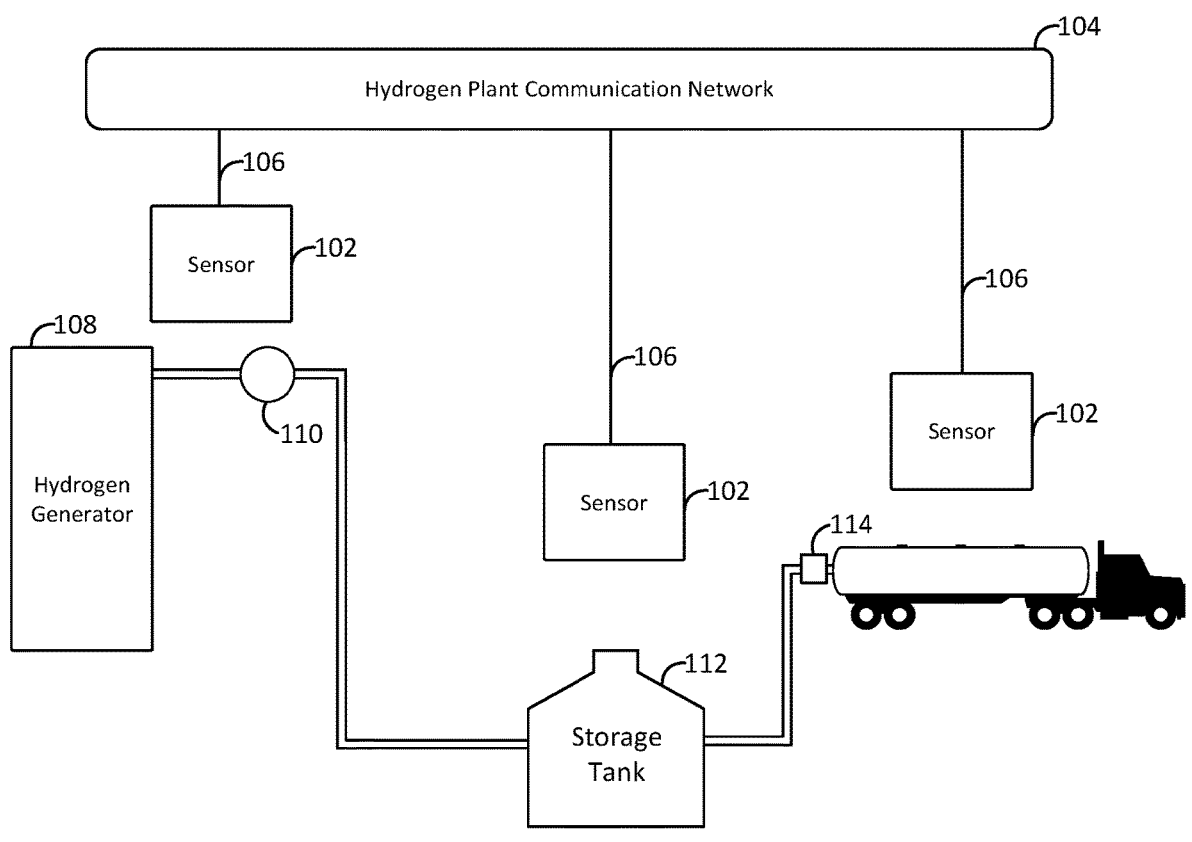

FIG. 1 is a schematic diagram of a conventional system 100 for hydrogen plant condition monitoring. The system 100 may include a plurality of sensors 102, such as hydrogen sensors and/or hydrogen flame sensors, which are used to detect unsafe conditions including hydrogen leakage and/or hydrogen flames.

The sensors 102 may communicate with a hydrogen plant communication network 104 via wired connections 106, by which the hydrogen plant communication network 104 is physically extended to each sensor 102. However, considering the size and complexity of a typical hydrogen plant, the number and installation locations of the sensors 102 may be limited to a small number of sensors 102 positioned at strategic locations within the plant (e.g., hydrogen generator 108, valves 110, storage tanks 112, distribution nodes 114, etc.), leaving the rest of the plant potentially vulnerable. Moving a sensor 102 requires running new wired connections 106, which is expensive and time-consuming.

Figure 2:
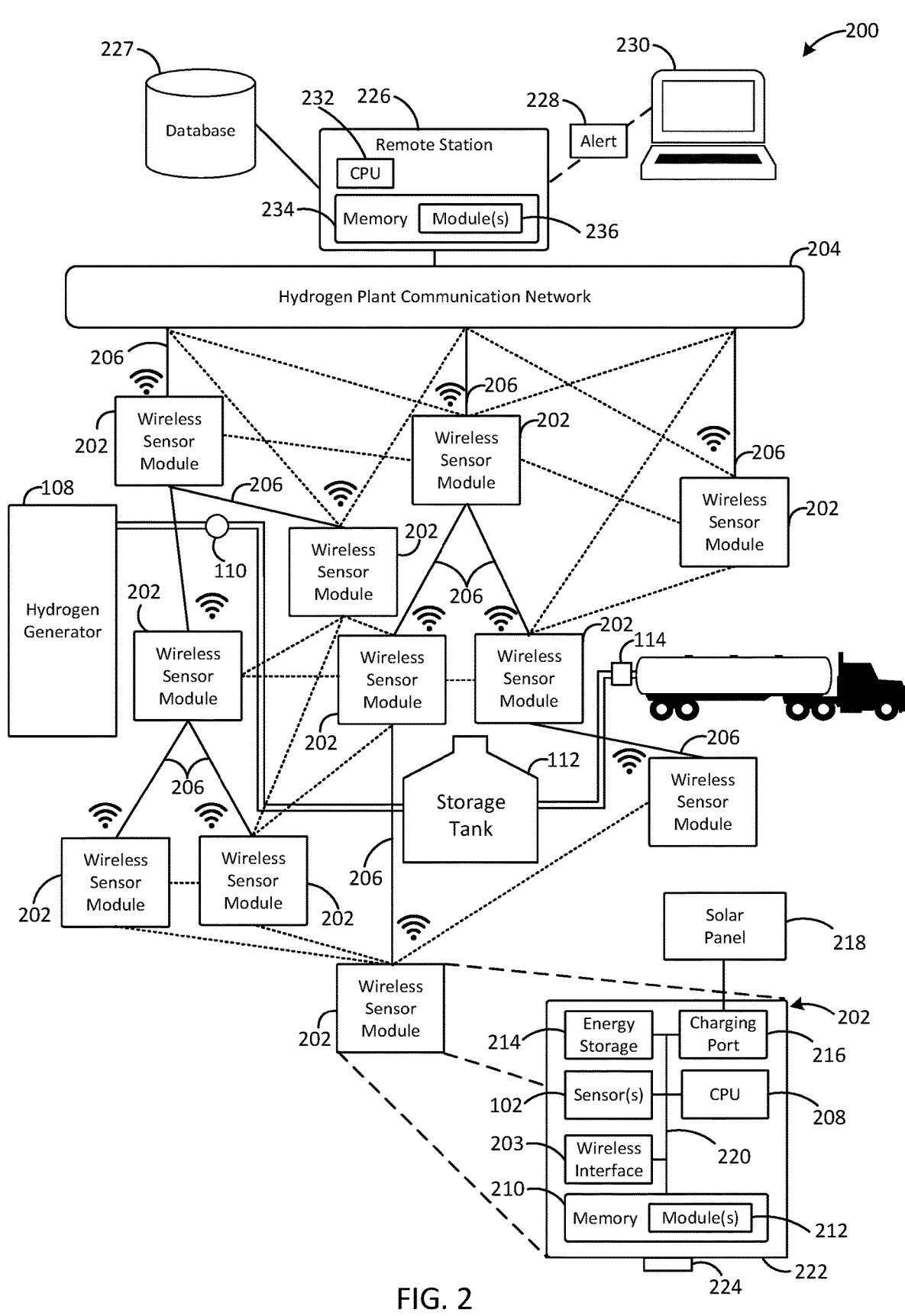
FIG. 2 is a block diagram of system for hydrogen plant condition monitoring according to an embodiment of the present disclosure.

FIG. 2 illustrates a system 200 for hydrogen plant condition monitoring according to an embodiment of the present disclosure. Unlike conventional approaches, the system 200 relies on a plurality of inexpensive wireless sensor modules 202, each of which may contain at least one sensor 102. Embodiments of sensors 102 for detecting hydrogen leakage may include hydrogen and/or hydrogen flame sensors. For example, the hydrogen flame sensors 102 may use infrared detection, ultra-violet detection, flame rods, or a combination thereof, to scan the area around the sensor location for detection of the hydrogen flame. Examples of such sensors 102 may include BWS1-R-Y hydrogen gas detector available from BW Technologies, a division of Honeywell International, Inc., and a X3302 multispectrum infrared (IR) hydrogen flame detector available from Det-Tronics, a division of Carrier Global.

In some embodiments, the sensors 102 may detect other conditions that could lead to hydrogen leakage or other unsafe conditions, as well as conditions that may reduce the efficiency of hydrogen production. For example, the sensors 102 may include, without limitation, ambient temperature sensors, humidity sensors, vibration sensors, movement or acceleration sensors (e.g., accelerometers, gyroscopes, GPS sensors), distance measurement sensors, snow or water level measurement sensors, moisture sensors, other gas sensors (e.g., oxygen, ammonia, carbon monoxide and/or explosive gas sensors), electric arc sensors, and/or electrical or mechanical hot spot sensors. The sensors 102 may detect, for example, that one or more environmental variables, such as temperature, humidity, or vibrations, are out of a prescribed range. For example, one or more of the sensors 102 may be a thermal imaging sensor. If a pump overheats for various reasons, such as bearing wear and tear, the overheating could be detected by the thermal imaging sensor 102, so that the bearing is fixed proactively to avoid the down-time. Thus, the wireless sensor modules 202 can be used for predictive maintenance.

An individual wireless sensor module 202 may include one sensor 102 or a plurality of sensors 102, which may include different types of sensors 102. In addition, two or more of the plurality of wireless sensor modules 202 may include different sensors 102, which may be used in combination in order to detect a variety of conditions within a hydrogen plant.

Each sensor 102 is operatively connected to a wireless interface 203 to communicate detected conditions to a hydrogen plant communication network 204 (hereinafter "network 204"). The wireless interface 203 may provide a wireless connection 206 with the network 204 and/or with the wireless interfaces 203 of other wireless sensor modules 202. Each wireless interface 203 may implement one or more wireless standards including, but not limited to, IEEE 802.11x, WiFi, ZigBee, Bluetooth, BLE, LoRa, ESP-Now, MQTT, GSM/GPRS/LTE and/or Z-Wave.

In some embodiments, the wireless interfaces 203 of a plurality of wireless sensor modules 202 may cooperatively form a network, such as a mesh network, which may include the network 204. This allows the wireless sensor modules 202 to cooperatively extend the network 204 over a wider area of the hydrogen plant than the wireless range of any of the wireless interfaces 203, alone, alleviating the need for separate repeater hardware or physically extending the network 204 to each wireless sensor module 202.

Each wireless sensor module 202 may further include a CPU 208, such as microcontroller, microprocessor, field programmable gate array (FPGA), or other processing unit capable of facilitating the acquisition and communication of data from each sensor 102 of the wireless sensor module 202. The CPU 208 may execute instructions stored in a memory 210. The instructions may be organized as software modules 212 to perform a variety of functions including, but not limited to, analyzing measurements from the sensor(s) 102, date/time and location information management, alarm and event management, communication link management (e.g., HTTP, MQTT, serial and/or similar communication protocols), database management, over-the-air update management, system health analytics and software watchdog, and power management (e.g., normal, low power and sleep modes).

A wireless sensor module 202 may also include an energy storage device 214, such as a battery or capacitor, as well as a charging port 216 for receiving electricity from an external source, such as a solar panel 218. The charging port 216 may include integration circuitry and/or a controller, such as maximum power point tracking (MPPT) controller, a pulse width modulation (PWM) controller, or the like, to control the receipt of electricity from solar panel 218 or other power source (e.g., wind, grid, etc.). In some embodiments, the solar panel 218 may be integrated into, and form a portion of, the wireless sensor module 202.

Each of the components of wireless sensor module 202 may be connected by a bus 220, which provides communication between the various components. In some embodiments, the wireless sensor module 202 may include a housing 222. Positioned on the housing 222 may be a magnet 224 or other suitable attachment mechanism for attaching the wireless sensor module 202 to the location to be monitored for safety and/or efficiency, such as the storage tank 112.

Data concerning conditions detected by the wireless sensor module 202 may be communicated via the network 204 to a remote station 226, such as a computer server, which may store the data in a database 227. If a wireless sensor module 202 detects a condition affecting safety or efficiency (i.e., monitors data indicative of the condition), the remote station 226 may transmit an alert 228 to a terminal 230 or other device (e.g., mobile device) notifying a user of the condition affecting safety or efficiency. The alert 228 may be sent as an email, a text message, a telephone call, a push notification, or the like. The alert 228 may be sent via the network 204 or using another network, such as a cellular or satellite network.

The remote station 226 may include a CPU 232 that executes instructions stored in a memory 234 to facilitate, among other things, access to the database 227 and communicating alerts 228 to the terminal 230. The instructions may be organized as one or more software modules 236 to perform specific functions when executed by the CPU 208. For example, one or more software modules 236 may be programmed to receive data from a wireless sensor module 202, determine whether the data exceeds a threshold (e.g., detected hydrogen exceeds a predetermined value), and transmit a corresponding alert 228 to the terminal 230 notifying a user of the unsafe (or other) condition. In some embodiments, the software modules 236 may perform various other functions including, but not limited to, analyzing measurements from the sensor(s) 102, date/time and location information management, alarm and event management, communication link management (e.g., HTTP, MQTT, serial and/or similar communication protocols), database management, over-the-air update management, system health analytics and software watchdog, and power management (e.g., normal, low power and sleep modes). Such functions may be performed in cooperation with software modules 212 within the wireless sensor modules 202.

In some embodiments, a wireless sensor module 202 may be configured to transmit an alert 228 directly to the terminal 230 via the network 204 without the interposition of the remote station 226. In other embodiments, the wireless sensor module 202 may perform some functions while the remote station 226 performs other functions with the objective of monitoring for, and alerting a user regarding, unsafe (or other) conditions in the hydrogen plant.

As described in greater detail hereafter, the wireless sensor module may include an internet of things (IOT) platform (e.g., the CPU 208, memory 210, a real-time communication (RTC) system and subsystems, sensor interfaces, watchdogs, etc.), power supplies (battery, DC or AC power input, solar PV input, and associated controllers), communication modules, and various sensors 102 (hydrogen, infra-red, infra-red imaging or "thermal" camera, visible light camera, thermometer, humidity detector, vibration detector, accelerometer, gyroscope, GPS for position and/or time, etc.).

For example, one type of sensor 102 included in a wireless sensor module 202 may be an accelerometer. Data from the accelerometer may be used by the CPU 208 to determine whether the wireless sensor module 202 has fallen, or become disconnected from, a particular location that the wireless sensor module 202 is intended to monitor, such as the hydrogen generator 108, valve 110, storage tank

112, distribution nodes 114, or any other location for which it is desirable to monitor for particular conditions.

The aforementioned system 200 provides a cost-effective solution to increase the possibility of detecting unsafe conditions in a hydrogen plant and cover a wider area of protection. The system 200 makes the implementation of a secondary protection system easy while the system 200 could use a plurality of sensor technologies to monitor the condition of the hydrogen plant. Those of skill in the art will recognize that, while the system 200 is described in the context of hydrogen plant, the wireless sensor modules 202 could be used to monitor for unsafe conditions in a variety of environments, including factories, healthcare facilities, schools, and the like.

Figure 3:
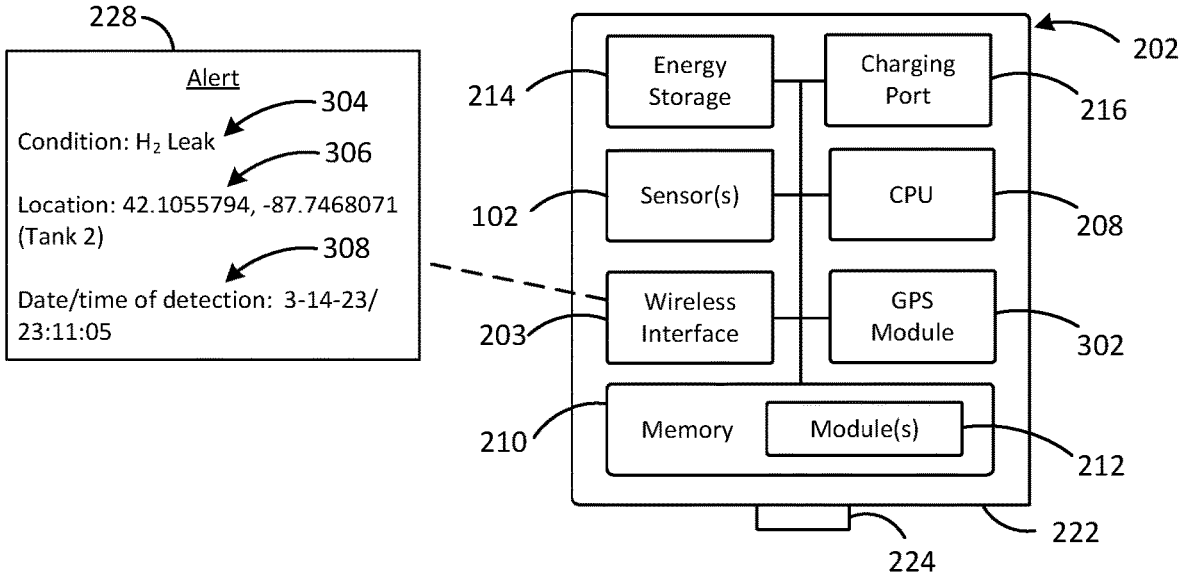
FIG. 3 is a block diagram of a wireless sensor module including a global positioning system (GPS) module according to an embodiment of the present disclosure.

Referring to FIG. 3, the wireless sensor module 202 may further include a GPS module 302 to detect one or more of the date, the time and/or the location of the wireless sensor module 202. The GPS location of the wireless sensor module 202 may be used to ensure correct placement for optimizing coverage of the hydrogen plant and the effectiveness of the mesh network 104. The GPS location may also be used to detect movement of the wireless sensor module 202.

In some embodiments, the GPS location and/or the GPS timed is included in an alert 228 that is generated by the wireless sensor module 202 and/or the remote station 226 (not shown). In the illustrated embodiment, an alert 228 may include the condition 304 identified by the one or more sensors 102, the location 306 (as determined by the GPS module 202), and a date/time of detection 308 (as determined by the GPS module 202). While the GPS module 302 is depicted in FIG. 3 as a separate module, those of skill in the art will recognize that the GPS module 302 could be regarded as one of the sensor(s) 102.

Figure 4:
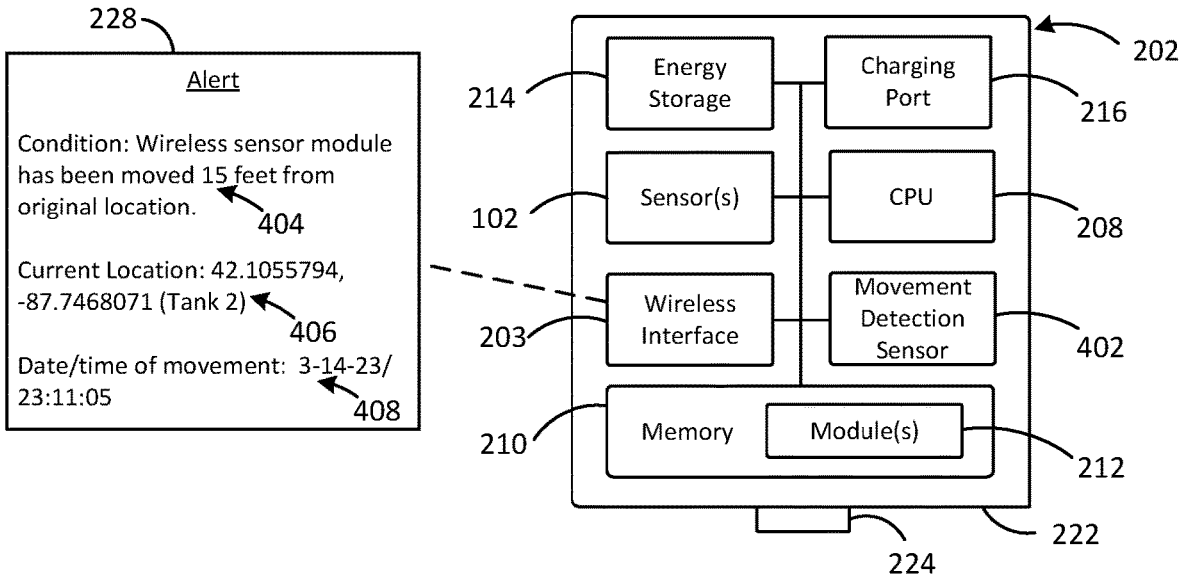
FIG. 4 is a block diagram of a wireless sensor module including a movement detection sensor according to an embodiment of the present disclosure.

Referring to FIG. 4, the wireless sensor module 202 may include a movement detection module 402 that determines whether (and, optionally, the extent to which) the wireless sensor module 202 has been moved from its original position. The movement detection module 402 may include one or more of a gyroscope, an accelerometer, or a global positioning system (GPS) sensor. In response to the movement detection module 402 determining that the wireless sensor module 202 has been moved, an alert 228 may be generated. The alert 228 may include a magnitude 404 of the movement (e.g., 15 ft.), as reported, for example, by a GPS sensor associated with the movement detection module 402. The alert 228 may further indicate the current location 406 of the wireless sensor module 202. In some embodiments, the alert 228 may include the date/time of movement 408 of the wireless sensor module 202.

Figure 5:
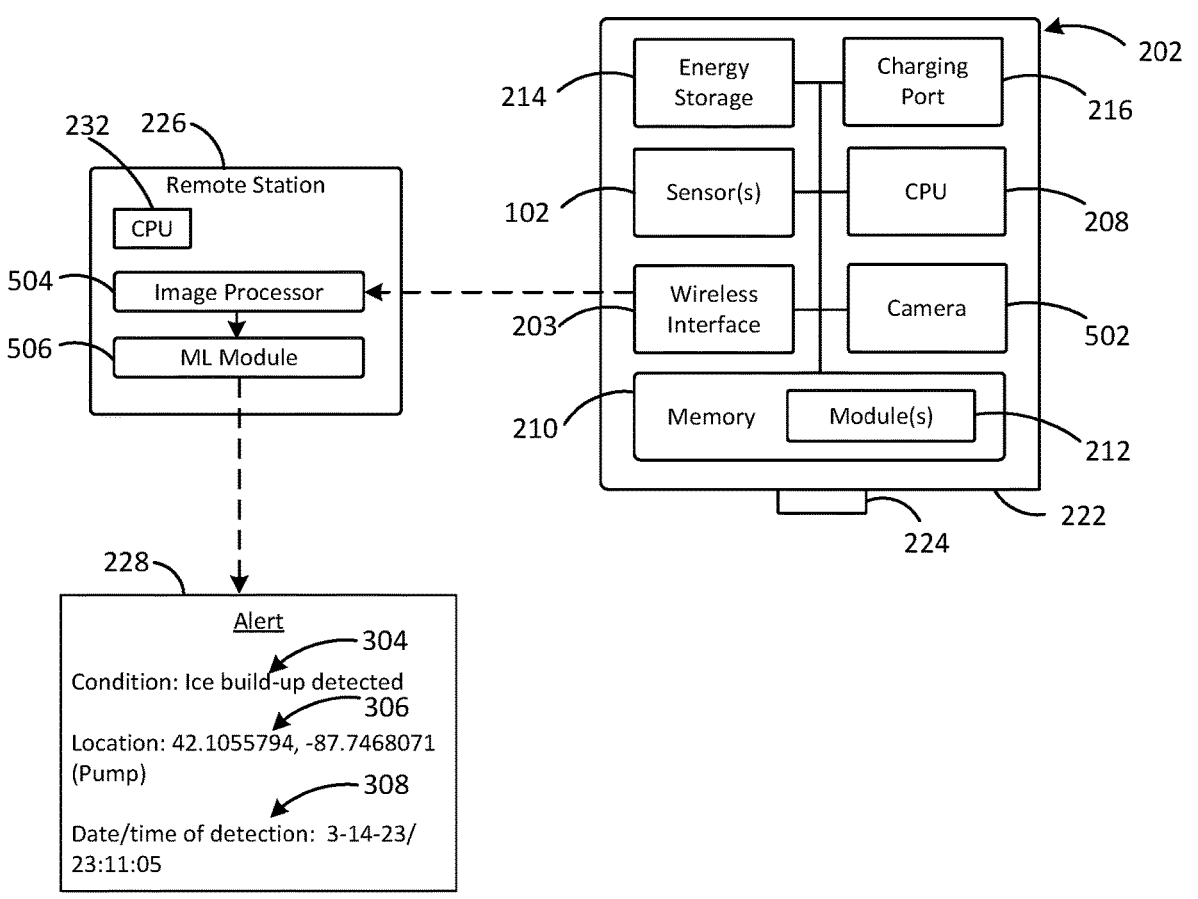
FIG. 5 is a block diagram of a wireless sensor module including a camera according to an embodiment of the present disclosure.

Referring to FIG. 5, the wireless sensor module 202 may include a camera 502 in some embodiments. While the camera 502 is depicted as a separate component, those of skill in the art will recognize that the camera 502 may be regarded as one of the sensor(s) 102 associated with the wireless sensor module 202. In certain embodiments, either the remote station 226 (as illustrated) or the wireless sensor module 202 may include an image processor 504 for processing images received by the camera 502. The camera 502 may be any suitable digital camera, such as G900 industrial digital camera available from Ricoh Imaging. The image processor may be embodied, for example, as a BCM8910X image processor available from Broadcom.

In some embodiments, raw image data may be captured by the camera 502 and sent to the remote station 226 via the wireless interface 203. The image processor 504 may perform image processing on the raw image data, such as enhancing certain features of interest in the image, morphological processing, segmentation, object recognition, and/or the like. The output of the image processor 504 may be provided to a machine learning (ML) module 506 for determining whether a particular condition is present. For example, the ML module 506 may be embodied as a neural network that has been trained on various images that have been tagged as containing ice build-up or not containing ice build-up. After training, the neural network of the ML module 506 may be able to determine whether ice build-up exists in the images captured by the camera 502. If so, an alert 228 may be generated noting the condition 304 (e.g., ice build-up), as well as the location 306 and date/time of detection 308 of the condition 304. Of course, the ML module 506 may utilize input from one or more other sensors 102 within the wireless sensor module 202 in addition to (or as an alternative to) images from the camera 502.

Figure 6:
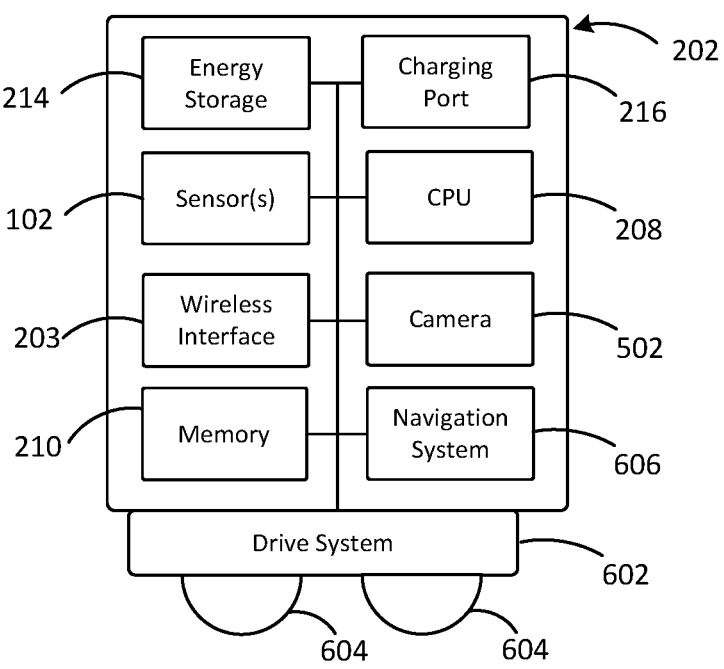
FIG. 6 is a block diagram of a wireless sensor module including a drive system according to an embodiment of the present disclosure.

Referring to FIG. 6, one or more of the wireless sensor modules 202 may be mobile rather than static. For example, the illustrated wireless sensor module 202 may include a drive system 602 that may include, for example, wheels 604, a DC motor, drivetrain, and control hardware/software (not shown) for moving the wireless sensor module 202 along a horizontal surface. In other embodiments, the drive system 602 could be replace with UAV (unmanned aerial vehicle) hardware to allow the wireless sensor module 202 to be carried in the air. Either embodiment may utilize the camera 502 discussed in connection with FIG. 5, as well as a navigation system 606 to allow movement of the wireless sensor module 202 to be remotely controlled from the remote station 226 of FIG. 2, such that the wireless sensor module 202 could move along prescribed routes within the hydrogen production plant.

FIG. 7 is a flowchart of a method 700 for monitoring a hydrogen plant according to an embodiment of the present disclosure. At step 702, the method 700 includes detecting at least one condition within the hydrogen plant via one or more sensors of a first wireless sensor module. In some embodiments, detecting the at least one condition within the hydrogen plant comprises detecting a hydrogen leak. In other embodiments, detecting the at least one condition within the hydrogen plant includes detecting an unsafe condition that increases a risk of a hydrogen leak. In still other embodiments, detecting the at least one condition within the hydrogen plant includes detecting an environmental variable being out of a prescribed range, wherein the environmental variable includes one or more of temperature, humidity, or vibrations.

In certain embodiments, detecting at least one condition within the hydrogen plant comprises detecting the at least one condition using at least one of a hydrogen sensor, a hydrogen flame sensor, or a combination thereof. The hydrogen flame sensor may include, for example, at least one of an infrared sensor, an ultra-violet sensor, a flame rod sensor, or a combination thereof. In some embodiments, detecting at least one condition within the hydrogen plant comprises detecting the at least one condition using an environmental sensor including one or more of a snow or water level measurement sensor, a moisture sensor, an explosive gas sensor, an electric arc sensor, or an electrical or mechanical hot spot sensor. In certain embodiments, detecting the at least one condition within the hydrogen plant via one or more sensors comprises detecting the at least one condition within the hydrogen plant via two or more sensors of the first wireless sensor module.

At step 704, the method 700 further includes transmitting, via a wireless interface of the first wireless sensor module, data concerning the at least one condition to a wireless interface of a second wireless sensor module, the second wireless sensor module having one or more sensors.

At step 706, the method 700 also includes transmitting, via the wireless interface of the second wireless sensor module, the data concerning the at least one condition to a remote station communicatively coupled to a wireless network, such that the first wireless sensor module and the second wireless sensor module cooperatively extend the wireless network to an area of the hydrogen plant that is wider than a range of an individual wireless interface of the first wireless sensor module or the second wireless sensor module. For example, at step 708, the method 700 includes cooperatively producing a mesh network using the wireless interface of the first wireless sensor module and the wireless interface of the second wireless sensor module in conjunction with wireless interfaces of a plurality of other wireless sensor modules.

At step 710, the method 700 also includes using a GPS module within the first wireless sensor module to determine at least one of a time, a date, or a location for the at least one wireless sensor module and transmitting the at least one of the time, the date, or the location to the remote station for inclusion in an alert.

In some embodiments, the method 700 further includes detecting a movement of the first wireless sensor module using a movement detection sensor, where detecting the movement of the first wireless sensor module includes detecting the movement using at least one of a gyroscope, an accelerometer, or a global positioning system (GPS) sensor.

In other embodiments, the method 700 further includes detecting at least one condition within the hydrogen plant comprises capturing images via a camera and transmitting the images to an image processor within the remote station.

In still other embodiments, the method 700 further includes using a machine learning system to detect the at least one condition based on input from the one or more sensors of the first wireless sensor module. In certain embodiments, using the machine learning system comprises using a trained neural network.

In additional embodiments, the method includes coupling a magnet to a housing of the first wireless sensor module and coupling the magnet to a location to be monitored, such as a hydrogen storage tank.

In further embodiments, the method includes coupling the first wireless sensor module to a drive system and moving the first wireless sensor module via the drive system. In some embodiments, the method may include controlling movement of the first wireless sensor module from the remote station using a navigation system within the first wireless sensor module in communication with the drive system.

Numerous examples are provided herein to enhance understanding of the present disclosure. A specific set of statements is provided as follows.

Statement 1. A system for monitoring a hydrogen plant, comprising: a plurality of wireless sensor modules, each wireless sensor module including: at least one sensor configured for monitoring for at least one condition; and a wireless interface configured for transmitting data concerning the at least one condition via a wireless network to a remote station when the at least one condition is detected by the at least one sensor; wherein the plurality of wireless sensor modules cooperatively extend the wireless network to an area of the hydrogen plant wider than a range of an individual wireless interface.

Statement 2. The system of statement 1, wherein the at least one condition comprises a hydrogen leak.

Statement 3. The system of statements 1-2, wherein the at least one condition comprises an unsafe condition that increases a risk of a hydrogen leak.

Statement 4. The system of statements 1-3 wherein the at least one condition comprises an environmental variable being out of a prescribed range, wherein the environmental variable includes one or more of temperature, humidity, and vibrations.

Statement 5. The system of statements 1-4, wherein the plurality of wireless sensor modules cooperatively produce a mesh network.

Statement 6. The system of statements 1-5, wherein the at least one sensor of at least one of the plurality of wireless sensor modules includes one or more of a hydrogen sensor, a hydrogen flame sensor, or a combination thereof.

Statement 7. The system of statements 1-6, wherein the hydrogen flame sensor includes at least one of an infrared sensor, an ultra-violet sensor, a flame rod sensor, or a combination thereof.

Statement 8. The system of statements 1-7, wherein the at least one sensor of at least one of the plurality of wireless sensor modules includes an environmental sensor including one or more of an ambient temperature sensor, a humidity sensor, or a vibration sensor.

Statement 9. The system of statements 1-8, wherein the at least one sensor of at least one of the plurality of wireless sensor modules includes an environmental sensor including one or more of a snow or water level measurement sensor, a moisture sensor, an explosive gas sensor, an electric arc sensor, or an electrical or mechanical hot spot sensor.

Statement 10. The system of statements 1-9, wherein the at least one sensor of at least one of the plurality of wireless sensor modules includes at least one of a movement detection sensor.

Statement 11. The system of statements 1-10, wherein the movement detection sensor includes at least one of a gyroscope, an accelerometer, or a global positioning system (GPS) sensor.

Statement 12. The system of statements 1-11, wherein the at least one sensor of at least one of the plurality of wireless sensor modules includes a camera, and the at least one of the plurality of wireless sensor modules includes an image processing system for processing images received by the camera.

Statement 13. The system of statements 1-12, wherein at least one of the plurality of wireless sensor modules includes a machine learning system for detecting the at least one condition based on input from the at least one sensor.

Statement 14. The system of statements 1-13, wherein the machine learning system comprises a trained neural network.

Statement 15. The system of statements 1-14, wherein at least one of the plurality of wireless sensor modules includes two or more different sensors.

Statement 16. The system of statements 1-15, wherein at least one wireless sensor module of at least one of the plurality of wireless sensor modules includes a GPS module to determine at least one of a time, a date, or a location of the at least one wireless sensor module, and wherein the at least one of the plurality of wireless sensor modules transmits the at least one of the time, the date, or the location to the remote station via the wireless network.

Statement 17. The system of statements 1-16, wherein at least one wireless sensor module of the plurality of wireless sensor modules includes an energy storage device and a charging port to charge the energy storage device from an external power source.

Statement 18. The system of statements 1-17, wherein at least one wireless sensor module of the plurality of wireless sensor modules comprises: a housing; and a magnet coupled to the housing for attaching the at least one wireless sensor module to a metal structure.

Statement 19. The system of statements 1-18, wherein at least one wireless sensor module of the plurality of wireless sensor modules comprises: a drive system to move the at least one wireless sensor module.

Statement 20. The system of statements 1-19, wherein the at least one wireless sensor module of the plurality of wireless sensor modules further comprises a navigation system to control movement of the at least one wireless sensor module from the remote station.

Statement 21. A method for monitoring a hydrogen plant, comprising: detecting at least one condition within the hydrogen plant via one or more sensors of a first wireless sensor module; transmitting, via a wireless interface of the first wireless sensor module, data concerning the at least one condition to a wireless interface of a second wireless sensor module, the second wireless sensor module having one or more sensors; transmitting, via the wireless interface of the second wireless sensor module, the data concerning the at least one condition to a remote station communicatively coupled to a wireless network, such that the first wireless sensor module and the second wireless sensor module cooperatively extend the wireless network to an area of the hydrogen plant that is wider than a range of an individual wireless interface of the first wireless sensor module or the second wireless sensor module.

Statement 22. The method of statement 21, wherein detecting the at least one condition within the hydrogen plant comprises detecting a hydrogen leak.

Statement 23. The method of statements 21-22, wherein detecting the at least one condition within the hydrogen plant comprises detecting an unsafe condition that increases a risk of a hydrogen leak.

Statement 24. The method of statements 21-23, wherein detecting the at least one condition within the hydrogen plant comprises detecting an environmental variable being out of a prescribed range, wherein the environmental variable includes one or more of temperature, humidity, or vibrations.

Statement 25. The method of statements 21-24, further comprising: cooperatively producing a mesh network using the wireless interface of the first wireless sensor module and the wireless interface of the second wireless sensor module in conjunction with wireless interfaces of a plurality of other wireless sensor modules.

Statement 26. The method of statements 21-25, wherein detecting at least one condition within the hydrogen plant comprises detecting the at least one condition using at least one of a hydrogen sensor, a hydrogen flame sensor, or a combination thereof.

Statement 27. The method of statements 21-26, wherein the hydrogen flame sensor includes at least one of an infrared sensor, an ultra-violet sensor, a flame rod sensor, or a combination thereof.

Statement 28. The method of statements 21-27, wherein detecting at least one condition within the hydrogen plant comprises detecting the at least one condition using an environmental sensor including one or more of an ambient temperature sensor, a humidity sensor, or a vibration sensor.

Statement 29. The method of statements 21-28, wherein detecting at least one condition within the hydrogen plant comprises detecting the at least one condition using an environmental sensor including one or more of a snow or water level measurement sensor, a moisture sensor, an explosive gas sensor, an electric arc sensor, or an electrical or mechanical hot spot sensor.

Statement 30. The method of statements 21-29, further comprising detecting the movement of the first wireless sensor module using a movement detection sensor.

Statement 31. The method of statements 21-30, wherein detecting the movement of the first wireless sensor module comprises detecting the movement using at least one of a gyroscope, an accelerometer, or a global positioning system (GPS) sensor.

Statement 32. The method of statements 21-31, wherein detecting at least one condition within the hydrogen plant comprises capturing images via a camera and transmitting the images to an image processor within the remote station.

Statement 33. The method of statements 21-32, further comprising using a machine learning system to detect the at least one condition based on input from the one or more sensors of the first wireless sensor module.

Statement 34. The method of statements 21-33, wherein using the machine learning system comprises using a trained neural network.

Statement 35. The method of statements 21-34, wherein detecting the at least one condition within the hydrogen plant via one or more sensors comprises detecting the at least one condition within the hydrogen plant via two or more sensors of the first wireless sensor module.

Statement 36. The method of statements 21-35, further comprising: using a global positioning system (GPS) module within the first wireless sensor module to determine at least one of a time, a date, or a location for the first wireless sensor module; and transmitting the at least one of the time, the date, or the location to the remote station for inclusion in an alert.

Statement 37. The method of statements 21-36, further comprising: coupling a magnet to a housing of the first wireless sensor module; and coupling the magnet to a location to be monitored.

Statement 38. The method of statements 21-37, further comprising: coupling the first wireless sensor module to a drive system; and moving the first wireless sensor module via the drive system.

Statement 39. The method of statements 21-38, further comprising: controlling movement of the first wireless sensor module from the remote station using a navigation system within the first wireless sensor module in communication with the drive system.

Statement 40. A non-transitory computer-readable medium comprising program code that, when executed by one or more processors, cause the one or more processors to perform operations including: detecting at least one condition within a hydrogen plant via one or more sensors of a first wireless sensor module; transmitting, via a wireless interface of the first wireless sensor module, data concerning the at least one condition to a wireless interface of a second wireless sensor module, the second wireless sensor module having one or more sensors; and transmitting, via the wireless interface of the second wireless sensor module, the data concerning the at least one condition to a remote station communicatively coupled to a wireless network, such that the first wireless sensor module and the second wireless sensor module cooperatively extend the wireless network to an area of the hydrogen plant that is wider than a range of an individual wireless interface of the first wireless sensor module or the second wireless sensor module.

Embodiments of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, any other magnetic medium, any other optical medium, RAM, PROM, EPROM, a FLASHEP-ROM, and any other memory chip or cartridge.

Aspects of the present disclosure are set forth in the following description and related figures directed to specific embodiments. Those of skill in the art will recognize that alternate embodiments may be devised without departing from the scope of the appended claims. Additionally, well-known elements will not be described in detail or will be omitted so as not to obscure more relevant details.

As used herein, the word exemplary means serving as an example, instance, or illustration. The embodiments described herein are not limiting but rather are exemplary only. The described embodiments are not necessarily to be construed as preferred or advantageous over other embodiments. Moreover, the terms "embodiments of the invention," "embodiments," or "invention" do not require that all embodiments include the discussed feature, advantage, or mode of operation.

Further, many of the embodiments described herein are described in sequences of actions to be performed by, for example, elements of a computing device. Those skilled in the art will recognize that specific circuits can perform the various sequence of actions described herein (e.g., application-specific integrated circuits or "ASICs") and/or by program instructions executed by at least one processor. Additionally, the sequence of actions described herein can be embodied entirely within any form of non-transitory computer-readable storage medium. The execution of the sequence of actions enables the processor to perform the functionality described herein. Thus, the various aspects of the present disclosure may be embodied in several different forms, all of which have been contemplated to be within the scope of the claimed subject matter. In addition, for each of the embodiments described herein, the corresponding form of any such embodiments may be described herein as, for example, a computer configured to perform the described action.

When listing various aspects of the products, methods, or system described herein, any feature, element, or limitation of one aspect, example, or claim may be combined with any other feature, element, or limitation of any other aspect when feasible (i.e., not contradictory).

As used herein, the singular forms "a," "an," and "the" include plural references unless the context clearly dictates otherwise. Although any systems and methods similar or equivalent to those described herein can be used to practice or test embodiments, only some exemplary systems and methods are now described. It should be understood that the embodiments are intended to be open-ended in that an item or items used in the embodiments is not meant to be an exhaustive listing of such items or items or meant to be limited to only the listed item or items.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teachings. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims.

What is claimed is:

1. A system for monitoring a hydrogen plant, comprising:
a first mobile wireless hydrogen flame sensor module including:
a first hydrogen flame sensor configured for detecting a hydrogen flame indicative of a hydrogen leak within the hydrogen plant;
a first wireless interface configured for transmitting data concerning the hydrogen leak via a wireless network to a second mobile wireless hydrogen flame sensor module when the hydrogen leak is detected by the first hydrogen flame sensor;
a first drive system including a motor, drive train, and controller that moves the first mobile wireless hydrogen flame sensor module along a surface; and
a first navigation system that controls movement of the first mobile wireless hydrogen flame sensor module; and
the second mobile wireless hydrogen flame sensor module including:
a second hydrogen flame sensor;
a second wireless interface configured for transmitting the data concerning the hydrogen leak via the wireless network to a remote station when the hydrogen leak is detected by the first hydrogen flame sensor;
a second drive system including a motor, drive train, and controller that moves the second mobile wireless hydrogen flame sensor module along the surface; and
a second navigation system that controls movement of the second mobile wireless hydrogen flame sensor module;
wherein the first mobile wireless hydrogen flame sensor module is movable by the first drive system beyond a wireless communication range of the remote station in response to communication from the remote station through the second wireless interface and the first wireless interface.

2. The system of claim 1, wherein the first mobile wireless hydrogen flame sensor module further includes a humidity sensor configured to detect a humidity level within the hydrogen plant that is outside a prescribed level that increases a risk of a hydrogen leak, wherein the first wireless interface is configured for transmitting data concerning the detected humidity via the wireless network to the second mobile wireless hydrogen flame sensor module, and wherein the second wireless interface is configured for transmitting the data concerning the detected humidity via the wireless network to the remote station.

3. The system of claim 1, wherein the first and second mobile wireless hydrogen flame sensor modules are configured to cooperatively produce a mesh network.

4. The system of claim 1, wherein the first hydrogen flame sensor includes at least one a flame rod sensor or a combination of the flame rod sensor and an ultra-violet sensor.

5. The system of claim 1, wherein the first mobile wireless hydrogen flame sensor module includes a vibration sensor for detecting vibrations within the hydrogen plant that increase a risk of a hydrogen leak, wherein the first wireless interface is configured for transmitting data concerning the detected vibrations via the wireless network to the second mobile wireless hydrogen flame sensor module, and wherein the second wireless interface is configured for transmitting the data concerning the detected vibrations via the wireless network to the remote station.

6. The system of claim 1, wherein the first mobile wireless hydrogen flame sensor module further includes a snow level measurement sensor for detecting a snow level within the hydrogen plant, wherein the first wireless interface is configured for transmitting data concerning the detected snow level via the wireless network to the second mobile wireless hydrogen flame sensor module, and wherein the second wireless interface is configured for transmitting the data concerning the detected snow level via the wireless network to the remote station.

7. The system of claim 1, wherein the first mobile wireless hydrogen flame sensor module further includes a movement detection sensor configured to detect movement of the first mobile wireless hydrogen flame sensor module relative to its original position and generate an alert in response to a detected movement, wherein the first wireless interface is configured for transmitting the alert via the wireless network to the second mobile wireless hydrogen flame sensor module, and wherein the second wireless interface is configured for transmitting the alert via the wireless network to the remote station.

8. The system of claim 7, wherein the movement detection sensor includes at least one of a gyroscope, an accelerometer, or a global positioning system (GPS) sensor.

9. The system of claim 1, wherein the first mobile wireless hydrogen flame sensor module includes a camera for capturing images within the hydrogen plant, wherein the first wireless interface is configured for transmitting the images via the wireless network to the second mobile wireless hydrogen flame sensor module, and wherein the second wireless interface is configured for transmitting the images via the wireless network to the remote station.

10. The system of claim 1, wherein the first mobile wireless hydrogen flame sensor module includes a machine learning system for detecting the hydrogen flame based on input from the first hydrogen flame sensor.

11. The system of claim 10, wherein the machine learning system comprises a trained neural network.

12. The system of claim 1, wherein the first mobile wireless hydrogen flame sensor module includes a GPS module to determine at least one of a time, a date, or a location of the first mobile wireless hydrogen flame sensor module, and wherein the first wireless interface is configured for transmitting the at least one of the time, the date, or the location via the wireless network to the second mobile wireless hydrogen flame sensor module, and wherein the second wireless interface is configured for transmitting the at least one of the time, the date, or the location via the wireless network to the remote station.

13. The system of claim 1, wherein at least one of the first and second mobile wireless hydrogen flame sensor modules comprises:

a housing; and a magnet coupled to the housing for attaching the at least one of the first and second mobile wireless hydrogen flame sensor module to a metal structure for which hydrogen flame monitoring thereof is required.

* * * * *